Patented Oct. 18, 1927.

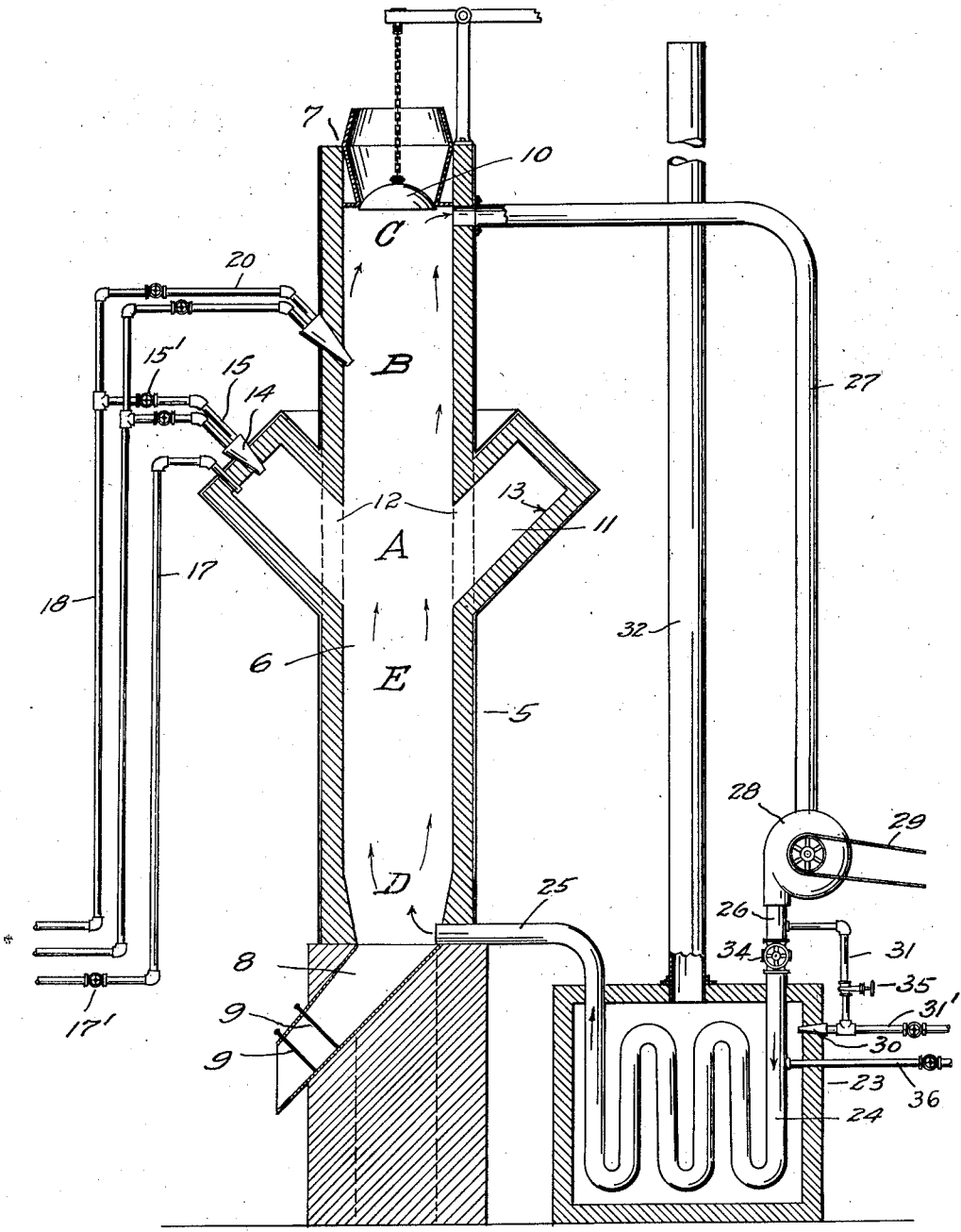

1,645,968

UNITED STATES PATENT OFFICE.

WILLIAM WALLACE PERCY, OF SEATTLE, WASHINGTON, ASSIGNOR OF ONE-FOURTH TO FRANK W. HARRIS, OF RENTON, WASHINGTON.

PROCESS OF MAKING SPONGE IRON FROM ITS OXIDE ORES.

Application filed March 13, 1922. Serial No. 543,507.

My invention has reference, in its broad aspect, to improvements in processes for reducing iron oxide ore through the employment of hydrocarbon fuels, either liquid or gaseous, as a reducing agent to produce a metallic form of iron commonly known as "sponge iron"; and more particularly it is my purpose to complete the reduction of the ore in a novel manner and accompanied by successive replenishing of the fuel values of the fuel gases thereby simplifying and carrying out the operation more economically and with better results than have heretofore been obtained by the reduction of such oxide ore with carboniferous reducing agents such as coke.

In order to impart a clear understanding of the various steps in my process designed to attain the above and other ends, I may briefly define my process as consisting of four major steps; first, I deliver a portion of the initial hydrocarbon fuel charge into that zone of the furnace stack wherein the blast from the tuyères is delivered; second, I deliver the remaining portion of my initial hydrocarbon fuel charge into the furnace above the tuyères and the first portion of the charge and simultaneously therewith; third, I draw off all or part of the accumulated gases from the top of the stack and pass them through a gas regenerator of the type distinguished by an incandescent bed of carbon, and; fourth, I re-deliver such regenerated gases to the furnace below the air blast from the tuyères and the point of delivery of the first portion of the initial charge.

The beneficial results attributable to these major steps in my process may be briefly defined as follows; first, the first portion of the initial hydrocarbon fuel charge admitted with the air blast preheats the ore to a reducing temperature, producing carbon dioxide ($CO_2$) and water vapor ($H_2O$); second, the remaining portion of the initial charge of hydrocarbon fuel serves among other things to increase the hydrogen content of the total fuel charge by disassociation of the hydro-carbon into free hydrogen (H) and free carbon (C). The carbon reacts upon the dioxide ($CO_2$) and water vapor ($H_2O$), producing additional free hydrogen and monoxide absorbing heat and cooling the furnace; third, the gas regenerator is supplied with heat from the combustion of a portion of the by-product gases from the furnace thus attaining a fuel saving. The gases are completely regenerated by passing the same through incandescent carbon in the regenerator; and fourth, the regenerated gases which are delivered below the tuyère zone come into contact with the preheated ore where the complete reduction is affected.

In carrying out my invention, ferruginous oxide-ore is progressively fed into the upper end of a vertical furnace from which air, except as needed is excluded and the sponge iron product withdrawn in charges from the bottom of the furnace. During its downward travel as a stream in the furnace the ore is affected by the action of burning hydrocarbon fuel in a chamber provided therefor intermediate the height of the furnace.

The accompanying drawing illustrates in sectional elevation apparatus for carrying out my invention.

In said drawing, the reference numeral 5 represents a vertical furnace containing a chamber 6, hereinafter designated as the furnace chamber, which extends from a feed opening 7 at the top to an inclined delivery chute 8 at the bottom of the furnace. 9, 9 are gate valves for regulating the flow of the sponge or reduced ore through said delivery chute. 10 represents a bell-closure for the feed opening 7.

At about its midheight, said furnace is provided with a chamber 11, hereinafter designated as the combustion chamber, which communicates with the interior of the furnace chamber 6 through an opening or openings, such as 12, provided in the peripheral wall of the latter to permit gases or products of combustion from the chamber 11 entering the furnace chamber. The combustion chamber 11 is provided with a floor 13 which, preferably, is inclined sufficiently to prevent the lodging thereon of any material which may enter the chamber 11 from the furnace chamber.

Provided for said combustion chamber is a burner 14, or a plurality of such burners, having hydrocarbon-fuel pipe connection 15, which is provided with a regulating valve 15'. Also extending into said combustion chamber is a tuyère pipe 17 provided with a regulating valve 17' to supply air for combustion purposes into the chamber 11.

The pipe connection 15 is illustrated as a branch of the pipe 18 leading from a fuel supply source or reservoir, not shown. The pipe 18, as shown, is provided with a valved branch connection 20 for supplying hydrocarbon fuel above the combustion chamber into the furnace chamber.

A gas regenerator of the type distinguished by an incandescent carbon bed is shown at 23, and all or a portion of the gases from the top of the furnace are delivered thereto through communicating pipe elements 26 and 27 constituting a system of which the fan or blower 28 is a part. The regenerator is supplied with fuel from a bye-pass 31 communicating with the pipe 26, and the regenerated gases are re-delivered through pipe 25 to the furnace. A chimney pipe 32 serves to remove the products of combustion from the regenerator.

The operation of my improved process is as follows: The iron oxide ores are introduced into the top of the furnace chamber as above explained, and the gaseous products of combustion pass from the combustion chamber 11 into the furnace and up through the descending iron oxide ores forming a heating and upper reducing zone indicated by A. In the first heating zone A the ore is heated to a sufficient temperature whereby the ore may be partially reduced, yet not to a temperature which will cause the formation of slag with the impurities of the ore. More or less of the iron oxide will be reduced by the carbon monoxide (CO) and the hydrogen (H) and hydrocarbon gases from the combustion of the fuel, the resulting gases which pass upward through the descending ore carry principally carbon dioxide ($CO_2$) and water vapor ($H_2O$).

At an elevation, indicated by B, above the combustion chamber 11, hydrocarbon fuel is admitted into the furnace chamber where it comes in contact with the ore already heated by the ascending gases from said combustion chamber.

Such injected hydrocarbon fuel in the presence of heated ore is more or less volatilized or distilled and reacts more or less completely with the carbon dioxide ($CO_2$) and water vapor ($H_2O$) of the ascending gases to change them principally to hydrogen (H), carbon monoxide (CO), free carbon (C), carbon dioxide ($CO_2$) with some possible hydrocarbons.

The free carbon here is formed by the condensation of the previously volatilized or distilled hydrocarbon fuel by contact with the colder ore in the upper part of the furnace. It is carried along with the balance of the gases and advantage is taken of its presence in the regeneration of the gases and in the regenerator 23, as hereinafter explained.

The gases which are partially regenerated in the upper part or zone C and are drawn off by the fan 28 and delivered to the conventional gas regenerator 23 through the circulating pipe 27—26 and a portion of such gases is supplied through the pipe 31 to be used for burning in the combustion chamber of the regenerator 23.

The balance of the gases, consisting of hydrogen (H), carbon monoxide (CO), free carbon (C), carbon dioxide ($CO_2$), with some possible hydrocarbons, from the top of the furnace chamber is passed through the regenerator 26, where the following reactions take place $C+CO_2=2CO$ and $C+H_2O=H_2+CO$.

This regenerated gas is then, with the exception of the inert nitrogen from the air, entirely composed of reducing or deoxidizing gases in the form of hydrogen (H) and carbon monoxide (CO) with a possible small percentage of hydrocarbon and free carbon.

This regenerated and highly reducing gas is then passed through pipe 25 into the bottom of the furnace chamber at D where the hydrocarbons remaining in the gases break down in the presence of hot metallic iron into carbon (C) and hydrogen ($H_2$), the iron absorbing this carbon and the mechanically held carbon of the gas, and holding this carbon while cooling, which prevents the oxidation of the iron during its cooling.

The heat absorption of this reaction greatly assists the cooling of the sponge iron while still under strictly reducing conditions, and at the same time removes from the gases any possible free carbon which would later tend to lower the temperature of the furnace at E to a point below which the desired reactions would take place.

It will be noted that at this stage of the process the gases are free from any carbon or hydrocarbons, which conditions are not obtained by other processes, and is a condition absolutely necessary for the successful production of sponge iron.

The purified gases pass upward in a lower reducing zone, indicated by E, and through the descending body of ore which has just passed through the highly heated region in front of the combustion chamber.

The highly heated iron oxides remaining in the ore unite with this reducing gas to form sponge or metallic iron in an unmolten state by either or both of the following reactions:

$$Fe_3O_4+8H=3Fe+4H_2O \text{ and}$$
$$Fe_3O_4+4CO=3Fe+4CO_2$$

This reaction takes place more rapidly and completely than in other processes due to the fact that the iron has a great absorption power for the hydrogen in the gases.

It is to be noted that the hydrogen unites with the oxygen of the ore to form water vapor which, in the absence of incandescent carbon, must pass upward through the descending ore column as such water vapor, until it reaches a point above the region above referred to with respect to the combustion chamber 11. There being no free carbon for the water vapor to unite with, eliminates the loss of heat which occurs in other processes where there is free carbon. The process is therefore more complete and efficient and different from other systems or processes in which the water vapor is liable to break down in the presence of incandescent carbon.

The time for said reduction of the ore is much shortened, giving greater capacity to the furnace due to the great affinity between the iron and the hydrogen.

The reduced ore, in the form of metallic or sponge iron, is drawn from the bottom of the furnace in a heated condition and either made into pig iron or steel utilizing the heat already contained therein.

What I claim, is,—

1. In a process of manufacturing iron from iron oxide ores, subjecting a zone of a downwardly movable column of ore to the action of hot combustion products derived from burning hydrocarbon fuels exteriorly of said column, introducing hydrocarbon fuel into the column of ore above said zone, withdrawing gases from the upper portion of said column and returning the gases in a regenerated state into the column of ore below said zone to complete the reduction of said ore.

2. A process of treating iron oxide ores in the manufacturing of sponge iron, consisting in causing the ore material to travel in a stream progressively downward through a region which is maintained at a high temperature by the combustion of hydrocarbon fuel, introducing a hydrocarbon fuel into said material in a zone located above said region, treating such gases in a regenerating furnace to increase the hydrogen and carbon monoxide content thereof and, finally, returning the gases under a forced draft into said stream below said region of high temperature to complete reduction of said ore.

3. In a process of manufacturing sponge iron from an iron oxide ore, subjecting a zone of a downwardly movable column of the ore to the action of products of combustion from burning hydrocarbon fuel, introducing hydrocarbon fuel into the ore column in a region above said zone, passing the gases collected in the upper portion of said column through a regenerator to increase the hydrogen and carbon monoxide content thereof, and delivering such regenerated gas into the column of ore below said zone for the complete reduction of the iron oxides of the ore.

4. In a process of manufacturing sponge iron from an iron oxide ore, subjecting a zone of a downwardly movable column of the ore to the action of products of combustion from burning hydrocarbon fuel, introducing hydrocarbon fuel into the ore column in a region above said zone, passing the gases collected in the upper portion of said column through a regenerator to increase the hydrogen and carbon monoxide content thereof, and delivering such regenerated gas into the column of ore below said zone for the complete reduction of the iron oxides of the ore.

5. In the manufacturing of iron from iron oxide ore, a furnace arranged to have a column of the ore travel progressively downwardly therethrough, connections between the upper and lower ends of the furnace and including a gas regenerator, a combustion chamber having an opening communicating with the interior of said furnace at approximately the midheight of the same for the introduction of hot combustion products derived by burning hydrocarbon fuel in said combustion chamber, means for supplying hydrocarbon fuel into the column of ore above the chamber opening into said furnace, and means associated with said connections to produce an upward circulation of gases through the column of ore in the furnace and downwardly from the upper end of the latter and through the regenerator to the lower end of the furnace.

6. The process of manufacturing iron from iron oxide ore consisting in subjecting a zone of a downwardly moving column of said ore to the action of burning hydrocarbon fuels, simultaneously subjecting the column of ore to the action of hydrocarbon fuels above the first mentioned zone, withdrawing the gases from the upper portion of the column and passing them through a regenerator of the type exemplified by an incandescent carbon bed to increase their hydrogen and carbon monoxide content, and finally delivering said regenerated gases to the column below the first mentioned zone to complete the reduction of the ore.

WILLIAM WALLACE PERCY.